(12) United States Patent
Lim

(10) Patent No.: US 8,994,685 B2
(45) Date of Patent: Mar. 31, 2015

(54) INPUT SENSING CIRCUIT AND TOUCH PANEL INCLUDING THE SAME

(75) Inventor: Seong-Taek Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 13/190,120

(22) Filed: Jul. 25, 2011

(65) Prior Publication Data

US 2012/0127122 A1    May 24, 2012

(30) Foreign Application Priority Data

Nov. 23, 2010 (KR) .................. 10-2010-0117051

(51) Int. Cl.
*G06F 3/045* (2006.01)
*H03K 17/96* (2006.01)
*H03K 17/945* (2006.01)
*G06F 3/041* (2006.01)
*G06F 3/044* (2006.01)
*G06F 3/01* (2006.01)

(52) U.S. Cl.
CPC .............. *G06F 3/0416* (2013.01); *G06F 3/044* (2013.01); *G06F 3/016* (2013.01)
USPC ............................ 345/174; 327/517; 345/173

(58) Field of Classification Search
None
See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett et al. | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,067,756 B2 | 6/2006 | Cok | |
| 7,131,073 B2 | 10/2006 | Rosenberg et al. | |
| 7,196,688 B2 | 3/2007 | Schena | |
| 7,202,837 B2 | 4/2007 | Ihara | |

(Continued)

FOREIGN PATENT DOCUMENTS

| CN | 1678978 A | 10/2005 |
|---|---|---|
| CN | 1829951 A | 9/2006 |

(Continued)

OTHER PUBLICATIONS

Non-Final US Office Action, dated Mar. 15, 2013, issued in U.S. Appl. No. 12/889,800.

(Continued)

*Primary Examiner* — Ariel Balaoing
*Assistant Examiner* — Maheen Javed
(74) *Attorney, Agent, or Firm* — Sughrue Mion, PLLC

(57) ABSTRACT

An input sensing device for sensing an input on a touch panel, and touch panel are provided. The input sensing device has a capacitance node and includes a charge pump to which an output signal from a first electrode of the capacitance node is input as a charge source in response to a sensing signal applied through a second electrode of the capacitance node. The input sensing device determines whether there is an input on the touch panel, based on an output voltage of the charge pump.

13 Claims, 22 Drawing Sheets

(56) References Cited

U.S. PATENT DOCUMENTS

| | | |
|---|---|---|
| 7,268,770 B1 | 9/2007 | Takahata et al. |
| 7,339,572 B2 | 3/2008 | Schena |
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 * | 1/2013 | Heubel et al. .................. 345/173 |
| 8,493,131 B2 | 7/2013 | Mo et al. |
| 8,581,866 B2 | 11/2013 | Park et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 * | 1/2003 | Andrade ........................ 382/124 |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1 | 8/2007 | Schoener et al. |
| 2007/0211032 A1 | 9/2007 | Ahn et al. |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich et al. |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026654 A1 | 2/2010 | Suddreth |
| 2010/0026655 A1 | 2/2010 | Harley et al. |
| 2010/0059295 A1 | 3/2010 | Hotelling et al. |
| 2010/0060610 A1 | 3/2010 | Wu |
| 2010/0149108 A1 | 6/2010 | Hotelling et al. |
| 2010/0156829 A1 | 6/2010 | Shimodaira |
| 2010/0177050 A1 | 7/2010 | Heubel et al. |
| 2010/0214232 A1 | 8/2010 | Chan et al. |
| 2010/0244858 A1 | 9/2010 | Cormier, Jr. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227633 A1 * | 9/2011 | Mo et al. ........................ 327/517 |
| 2011/0227862 A1 | 9/2011 | Lim |
| 2011/0279374 A1 | 11/2011 | Park et al. |
| 2012/0001857 A1 * | 1/2012 | Chang .......................... 345/173 |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0146936 A1 * | 6/2012 | Liu ................................ 345/174 |
| 2012/0262410 A1 | 10/2012 | Lim |

FOREIGN PATENT DOCUMENTS

| | | |
|---|---|---|
| CN | 101046720 A | 10/2007 |
| CN | 101510008 A | 8/2009 |
| CN | 101840296 A | 9/2010 |
| EP | 1 544 720 A1 | 6/2005 |
| EP | 2 026 178 A1 | 2/2009 |
| EP | 2 141 569 A2 | 1/2010 |
| EP | 2 079 052 B1 | 3/2011 |
| JP | 6-34940 A | 2/1994 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-236550 A | 8/2002 |
| JP | 2002-342035 A | 11/2002 |
| JP | 2004-071765 A | 3/2004 |
| JP | 2004-362428 A | 12/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-033739 A | 2/2008 |
| JP | 2008-257748 A | 10/2008 |
| JP | 2010-016969 A | 1/2010 |
| JP | 2010-79882 A | 4/2010 |
| JP | 2010-108505 A | 5/2010 |
| JP | 2011-3177 A | 1/2011 |
| JP | 2012-500089 A | 1/2012 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 02/089038 A2 | 11/2002 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |

(56) References Cited

FOREIGN PATENT DOCUMENTS

| WO | 2009/002605 A1 | 12/2008 |
|---|---|---|
| WO | 2010105705 A1 | 9/2010 |

OTHER PUBLICATIONS

Non-Final US Office Action, dated May 7, 2013, issued in U.S. Appl. No. 12/719,281.
European Communication, dated Mar. 19, 2013, issued in European Application No. 11150285.2.
Non-Final US Election Requirement, dated Apr. 10, 2013, issued in U.S. Appl. No. 13/097,937.
Non-Final US Office Action, dated Apr. 22, 2013, issued in U.S. Appl. No. 13/050,550.
Non-Final US Office Action, dated Feb. 1, 2013, issued in U.S. Appl. No. 13/103,221.
Non-Final US Office Action, dated Oct. 15, 2012, issued in U.S. Appl. No. 12/948,479.
Final US Office Action, dated Mar. 27, 2013, issued in U.S. Appl. No. 12/948,479.
Non-Final US Office Action, dated Aug. 28, 2012, issued in U.S. Appl. No. 12/849,310.
Final US Office Action, dated Dec. 20, 2012, issued in U.S. Appl. No. 12/849,310.
US Advisory Action, dated Apr. 26, 2013, issued in U.S. Appl. No. 12/849,310.
Communication (Extended European search report) dated Oct. 7, 2010 issued by the European Patent Office in counterpart European Application No. 10166013.2.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Apr. 3, 2014, issued in related U.S. Appl. No. 12/889,800.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.
Notice of Allowance, dated Jan. 22, 2014, issued by the USPTO in related U.S. Appl. No. 12/780,996.
Non-Final Office Action, dated Feb. 10, 2014, issued by the USPTO in related U.S. Appl. No. 12/719,281.
Communication dated Oct. 10, 2013 issued by the State Intellectual Property Office of P.R. China in counterpart Application 201010200349.1.
Final Office Action dated Nov. 22, 2013 issued by the United States Patent and Trademark Office in counterpart U.S. Appl. No. 12/849,310.
Final Office Action dated Dec. 5, 2013 issued by the United States Patent and Trademark Office in counterpart U.S. Appl. No. 13/050,550.
Non-Final Office Action dated Jun. 20, 2013 issued by the United States Patent and Trademark Office in counterpart U.S. Appl. No. 12/780,996.
Non-Final Office Action dated Jul. 17, 2013 issued by the United States Patent and Trademark Office in counterpart U.S. Appl. No. 13/097,937.
Non-Final Office Action dated Jul. 8, 2013 issued by the United States Patent and Trademark Office in counterpart U.S. Appl. No. 12/849,310.
Non-Final Office Action dated Aug. 12, 2013 issued by the United States Patent and Trademark Office in counterpart U.S. Appl. No. 13/224,422.
Non-Final Office Action dated Aug. 16, 2013 issued by the United States Patent and Trademark Office in counterpart U.S. Appl. No. 12/889,800.
Notice of Allowance dated Oct. 25, 2013 issued by the United States Patent and Trademark Office in counterpart U.S. Appl. No. 12/780,996.
Notice of Allowance dated Sep. 19, 2013 issued by the United States Patent and Trademark Office in counterpart U.S. Appl. No. 12/719,281.
Communication issued Oct. 16, 2014, by the European Patent Office in related Application No. 11186005.2.
Communication issued Oct. 8, 2014, by the State Intellectual Property Office of P.R. China in related Application No. 201010609836.3.
Communication issued Sep. 30, 2014, by the Japanese Patent Office in related Application No. 2010-265704.
Communication issued Oct. 29, 2014, by the State Intellectual Property Office of P.R. China in related Application No. 201010280797.7.

\* cited by examiner

INPUT SENSING CIRCUIT AND TOUCH PANEL INCLUDING THE SAME

CROSS-REFERENCE TO RELATED APPLICATION

This application claims priority from Korean Patent Application No. 10-2010-0117051, filed on Nov. 23, 2010, the entire disclosure of which is incorporated by reference herein for all purposes.

BACKGROUND

1. Field

Apparatuses consistent with the following description relate to an input device, and more particularly, to an input sensing device and a touch panel including the same.

2. Description of the Related Art

A touch panel is one example of a kind of user input device used to determine whether a user generates an input and the position of the user's input signal by sensing the user's contact thereon. A user may input data or signals to a touch panel by contacting or pressing a surface of the touch panel with a finger, a stylus pen or the like. The touch panel may be used as a touch pad functioning like a mouse in a laptop computer or a netbook, etc., or as an input switch of an electronic device. Also, the touch panel may be used in association with a display. A touch panel which is mounted on the screen of a display device, such as a liquid crystal display (LCD), a plasma display panel (PDP), a cathode ray tube (CRT) and the like, is generally called a "touch screen". A touch panel may be integrated with a display device to configure the screen of the display device or may be attached additionally on the screen of the display device.

In certain situations, a touch panel may be substituted for a user input device such as a keyboard, trackball, or mouse, and also may allow for simple manipulations. Moreover, the touch panel can provide users with various types of buttons according to the types of applications to be executed or stages of the executed application. Accordingly, a touch panel, and more specifically, a touch screen has been widely used as an input device for electronic equipment, such as a mobile phone, a personal digital assistant (PDA), a portable media player (PMP), a digital camera, a portable games, a Moving Picture Experts Group Layer-3(MP3) player, etc., as well as an automated teller machine (ATM), an information trader, a ticket vending machine, etc.

A touch panel can be classified into a resistive type, a capacitive type, an ultrasonic type, an infrared type, etc., according to methods of sensing user's inputs. Since the individual touch panel types have their unique merits and demerits, an appropriate method has been selected and used according to the types of applications, the use purpose of the touch panel, etc. A related art touch panel has a limitation in recognizing multiple touches, but recently, a capacitive type touch panel allowing multi-touch recognition has been introduced.

Capacitive type touch panels may be classified into a self-capacitive type and a mutual-capacitive type. The self-capacitive type provides a single electrode, for example, a sensor electrode, whereas the mutual-capacitive type provides a pair of electrodes facing each other with dielectric therebetween, that is, a capacitance node. The self-capacitive type and the mutual-capacitive type use different basic principles to determine whether there is an input. For example, a self-capacitive type touch panel may determine whether there is an input, based on differences in charge amount transferred through a sensor electrode caused by a touch. Meanwhile, a mutual-capacitive type touch panel may determine whether there is an input, based on changes in node capacitance caused by occurrence of a touch.

U.S. Patent Application Publication No. 2006/0097991 discloses an example of an input sensing circuit for sensing changes in node capacitance in a mutual-capacitive type touch panel. The input sensing circuit uses changes in capacitance between upper and lower electrodes due to differences in leaking charge amount caused by a touch. More specifically, a sensing signal is applied through a driving line so that the magnitude of the signal transferred to a sensing line changes due to a change in node capacitance, and the input sensing circuit amplifies the magnitude of the signal using a charge amplifier, etc. and then performs analog-to-digital conversion, thereby determining whether there is a touch. The disclosure of U.S. Patent Application Publication No. 2006/0097991 is herein incorporated by reference.

SUMMARY

One or more embodiments relate to an input sensing device capable of recognizing multiple touches and preventing wrong inputs, and a touch panel including the input sensing device.

One or more embodiments also relate to an input sensing device that has a simple circuit structure, operates stably against impulse noise, and can increase a sensing speed, and a touch panel including the input sensing device.

According to an aspect of an embodiment, there is provided an input sensing device for a touch panel having at least one capacitance node, the input sensing device comprising a charge pump to which an output signal from a first electrode of the at least one capacitance node is input as a charge source in response to a sensing signal applied through a second electrode of the at least one capacitance node, wherein the input sensing device determines whether there is an input on the touch panel, based on an output voltage of the charge pump.

According to an aspect of another embodiment, there is provided a touch panel including a first substrate on which a plurality of first electrode lines are arranged in parallel; a second substrate which is spaced apart from the first substrate and on which a plurality of second electrode lines perpendicular to the first electrode lines are arranged in parallel; a dielectric layer inserted between the first substrate and the second substrate; and a sensing unit configured to determine whether there is an input on the touch panel, based on a change in capacitance at capacitance nodes formed at intersections between the plurality of first electrode lines and the plurality of second electrode lines, wherein the sensing unit comprises a charge pump to which an output signal from the intersections between the first electrode lines and the second electrode lines is input as a charge source in response to a sensing signal that is sequentially applied to the first electrode lines, and the sensing unit determines whether there is the input on the touch panel, based on an output voltage of the charge pump.

According to an aspect of another embodiment, there is provided a touch panel including a touch panel body comprising a first substrate and a second substrate spaced apart from the first substrate by a gap, a plurality of electrode pairs formed on the first substrate and the second substrate, and electrorheological fluid disposed in the gap between the first substrate and the second substrate; a driving unit configured to apply a driving voltage for driving the electrorheological fluid to all or a portion of the plurality of electrode pairs; and a sensing unit configured to apply a sensing signal to the plurality of electrode pairs, and to determine whether there is an input on the touch panel based on a change in capacitance due to a change in thickness of the gap between the first substrate and the second substrate, in response to the sensing signal, wherein the sensing unit comprises a charge pump to which an output signal from the electrode pairs is input as a charge source, in response to the sensing signal, and the sensing unit determines whether there is the input on the touch panel, based on an output voltage from the charge pump.

BRIEF DESCRIPTION OF THE DRAWINGS

The above and/or other aspects will be more apparent from the following detailed description taken with reference to the accompanying drawings, in which.

DETAILED DESCRIPTION

Figure 1:
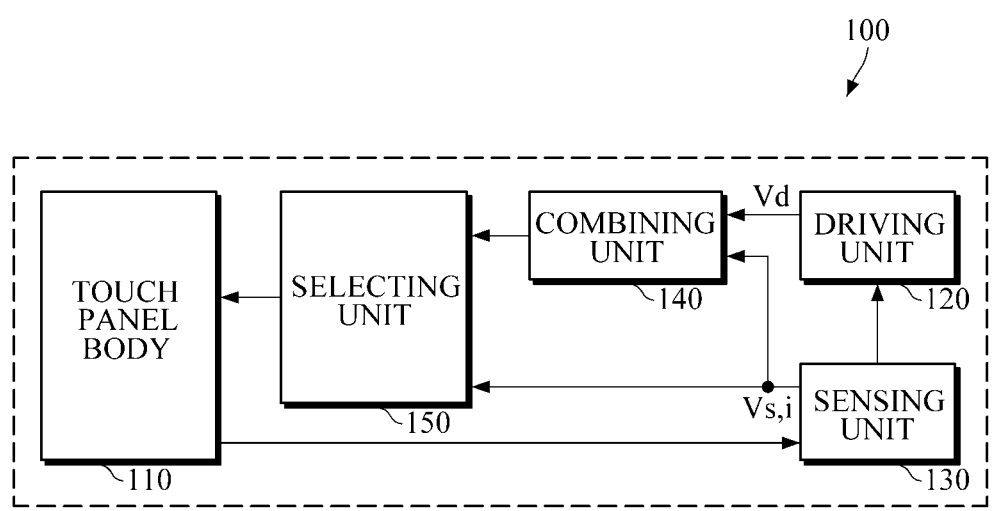
FIG. 1 is a diagram illustrating an example of a touch panel according to an embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

In this detailed description, a touch panel is one example of a kind of user input device and may be mounted onto various devices. For example, the touch panel may be used as an input device for various kinds of home or office appliances in which a touch input function is implemented, as well as a touch pad for a notebook, a netbook, etc. Also, the touch panel may be used as a touch screen that is mounted on the display of electronic equipment. For example, a touch panel has been widely used as an input device for electronic equipment, such as a mobile phone, a PDA, a PMP, an electronic book (E-book) terminal, a portable computer, an ATM, an information trader, a ticket vending machine, etc.

In this detailed description, a touch panel is one example of a mutual-capacitive type touch panel. The mutual-capacitive type touch panel includes a plurality of capacitance nodes arranged in a matrix form. For example, the mutual-capacitive type touch panel includes a plurality of capacitance nodes that are defined at intersections between a plurality of driving electrode lines and a plurality of sensing electrode lines. The touch panel determines whether an input occurs based on changes in capacitance at the capacitance nodes. In order to measure changes in capacitance at the capacitance nodes, the touch panel uses a signal output from the sensing electrodes of the capacitance nodes, which is responsive to a sensing signal applied to the driving electrodes of the capacitance nodes.

FIG. 1 is a diagram illustrating an example of a touch panel 100 according to an embodiment. The touch panel 100 illustrated in FIG. 1 is an example of a mutual-capacitive type touch panel, which uses electrorheological fluid. Referring to FIG. 1, the touch panel 100 includes a touch panel body 110, a driving unit 120, and a sensing unit 130. The touch panel 100 may further include a combining unit 140 and a selecting unit 150. The touch panel body 110 indicates a physical structure constructing the touch panel 100. The driving unit 120, the sensing unit 130, the combining unit 140, and the selecting unit 150 may be implemented as electrical circuits and/or a combination of hardware and software, or only software for controlling the operation of the touch panel body 110. The term "touch panel" used in the description may indicate simply the touch panel body 110 in a narrow sense, but may also indicate, in a broad sense, the entire touch panel 100 including the driving unit 120, the sensing unit 130, the combining unit 140, and/or the selecting unit 150.

The driving unit 120, the sensing unit 130, the combining unit 140, and the selecting unit 150 are shown as separate units depending on logical classification according to their functions. However, they may be integrated into a single unit.

Also, the logical function classification of the driving unit 120, the sensing unit 130, the combining unit 140, and the selecting unit 150 is also for convenience of description, and an integrated component (for example, such as a controller to control the operation of the touch panel) may perform all functions that can be performed by the driving unit 120, the sensing unit 130, the combining unit 140, and the selecting unit 150, or some functions that are performed by one of the driving unit 120, the sensing unit 130, the combining unit 140, and the selecting unit 150, with the remaining functions performed by some other component. Hereinafter, the structure and operation of the touch panel body 110 will be described in more detail.

Figure 2:
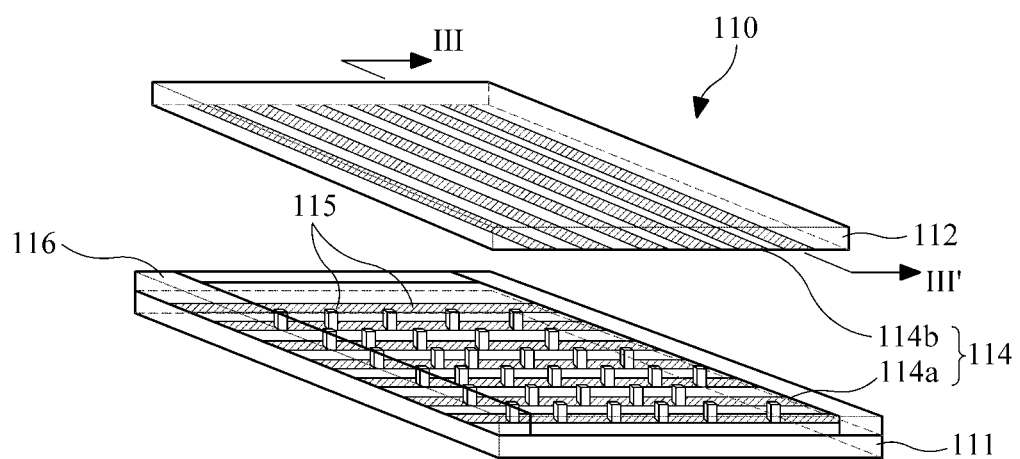
FIG. 2 is an exploded perspective view illustrating a touch panel body of the touch panel illustrated in FIG. 1.
Figure 3:
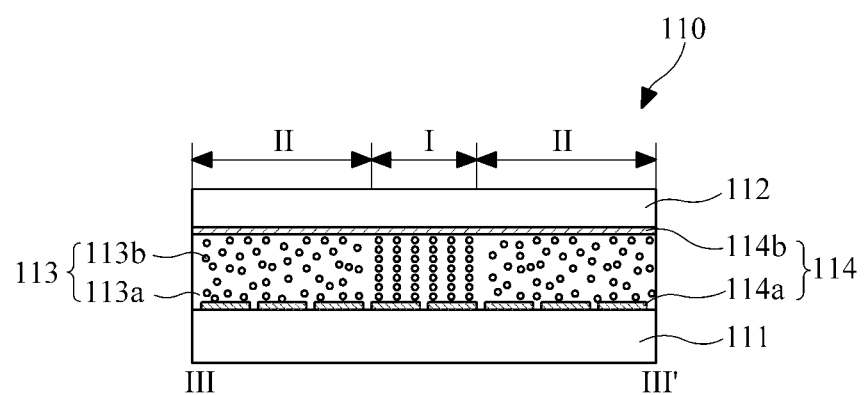
FIG. 3 is a cross-sectional view illustrating the touch panel body cut along a III-III' line of FIG. 2.

FIG. 2 is an exploded perspective view illustrating a schematic structure of the touch panel body 110 of the touch panel 100 illustrated in FIG. 1, and FIG. 3 is a cross-sectional view of the touch panel body 110 cut along a III-III' line of FIG. 2. Referring to FIGS. 2 and 3, the touch panel body 110 includes a pair of substrates, that is, a lower substrate 111 and an upper substrate 112, electrorheological fluid 113 filled in the gap between the lower substrate 111 and the upper substrate 112, and a plurality of electrode pairs 114.

The lower substrate 111 is a base substrate of the touch panel body 110, and acts as one side of a container for filling the electrorheological fluid 113 in the touch panel body 110. If the touch panel 100 is used as a touch screen of an electronic device, the lower substrate 111 may be a display of the electronic device or a substrate attached onto a display of the electronic device. The lower substrate 111 is not deformed when a certain attractive force or repulsive force is applied between the lower substrate 111 and the upper substrate 112. For prevention of deformation, the lower substrate 111 may be made of a hard substance, and for example, the lower substrate 111 may be a glass substrate made of transparent glass. However, there may be situations in which it is advantageous for the lower substrate 111 to be made of a material that is not a hard substance. For example, if the touch panel 100 is attached onto a hard display, the lower substrate 111 may be formed with a transparent polymer film.

The top side of the upper substrate 112 is a user contact surface (S) which a user contacts to input a signal. The upper substrate 112 may be deformed when a certain force is applied thereon. For example, when a user contacts or presses the user contact surface S with a finger, a stylus pen, etc., the upper substrate 112 may be deformed. For such deformation, the upper substrate 112 may be made of a transparent, deformable polymer film or the like. Also, the upper substrate 112 may be spaced an interval from the lower substrate 111, so that a gap having a thickness is formed between the upper substrate 112 and the lower substrate 111. The thickness of the gap may vary depending on the magnitude of a driving voltage, the size of the touch panel body 110, the cross section of the driving electrode pairs 114, etc.

The electrorheological fluid 113 is disposed in the gap between the lower and upper substrates 111 and 112. The electrorheological fluid 113 may be sealed up, and for sealing up the electrorheological fluid 113, sealant 116 may be applied onto the facing edge portions one or both of the lower substrate 111 and the upper substrate 112. The term electrorheological fluid denotes a suspension in which fine particles 113b are dispersed in electro-insulative fluid 113a. The viscosity of the electro-rheological fluid 113 varies maximally by 100,000 times when an electric field is applied thereto, and since such variation in viscosity is reversible, the viscosity returns to its original level when the electric field disappears.

The electro-insulative fluid 113a in the electro-rheological fluid 113 may be a transparent liquid such as, for example, silicon oil, kerosene mineral oil, olefin (PCBs), or the like. However, the electro-insulative fluid 113a may be any other material that possesses similar properties of low viscosity change with changing temperature, high flash point, low freezing point, etc. and for which the viscosity changes as a function of the electric field applied thereto. The particles 113b included in the electro-rheological fluid 113 may be very fine, transparent particles having a size of maximally about 50 μm. The particles may be polymers, such as aluminosilicate, polyaniline or polypyrrole, fullerene, etc., or any other kind of insulative materials, such as ceramics or the like. Non-transparent electro-rheological fluid may also be used in some applications.

Also, spacers 115 may be placed in a dispersed manner in the gap between the lower substrate 111 and the upper substrate 112. The spacers 115 are elastic elements made of small, transparent particles whose size is less than about several tens of micrometers. The elastic spacers 115 may be dispersed randomly or uniformly in the electrorheological fluid 113. The spacers 115 shown in FIG. 2 are exaggerated in size for convenience of description and representation in the drawings. Materials used to form the spacers 115 are not limited, and for example, the elastic spacers 115 may be made of elastomer. The spacers 115 are used to provide the upper substrate 112 with a restoring force in case the upper substrate 112 is deformed, and to support the upper substrate 120 structurally.

The plurality of electrode pairs 114 may be a group of electrode pairs composed of lower electrodes formed on the lower substrate 111 and upper electrodes formed on the upper substrate 112. In a mutual-capacitive type touch panel, the plurality of electrode pairs 114 may be arranged in a matrix type on the entire surface or a part of the touch panel body 110. A driving voltage may be applied to a predetermined combination of the electrode pairs 114, for example, to a part of the electrode pairs 114, wherein the predetermined combination of the electrode pairs 114 may depend on the type or processing stage of an application. Also, the touch panel 100 may offer a user a clicking sensation or various senses of input by controlling or changing the locations and number (for example, the location or width of a part to which a driving voltage is applied) of electrode pairs to which a driving voltage is applied among the electrode pairs 114, a timing at which the applied driving voltage is released, the number of electrode pairs from which the driving voltage is released, etc.

The electrode pairs 114 illustrated in FIG. 2 show an example of electrode pairs arranged in a matrix. Referring to FIG. 2, a plurality of electrode patterns 114a and 114b are respectively arranged in parallel on the upper surface of the lower substrate 111 and the lower surface of the upper substrate 112. Here, the electrode patterns 114a formed on the lower substrate 111, that is, lower electrode patterns 114a extend in a first direction, and the electrode patterns 114b formed on the upper substrate 112 extend in a second direction perpendicular to the first direction. Accordingly, the plurality of electrode pairs 114 are arranged in a matrix on the entire area of the touch panel body 110, such that, capacitance nodes are defined at intersections of the lower electrode patterns 114a and the upper electrode patterns 114b.

Unlike the example illustrated in FIG. 2, it is also possible that the lower and upper electrodes constructing the electrode pairs 114 may be disposed in a dot pattern on the lower substrate 111 and the upper substrate 112 in such a manner as to face each other. In this case, the lower and upper electrodes that face each other may be disposed in a matrix on the entire area or a part of the lower substrate 111 and the upper substrate 112. Each of the lower and upper electrodes may be in a polygon shape or in a circle shape. Also, the electrode pairs arranged in the dot patterns may be individually connected to active devices allowing switching, so that the electrode pairs can be individually switched in response to a driving signal (or a control signal) and/or sensed in response to a sensing signal. That is, FIG. 2 shows line-type electrode patterns. However, it is also possible to provide an N×N array of electrodes on both the top and bottom, such that each individual pair of electrodes (top and bottom) is separately addressable and controllable.

Referring again to FIGS. 1 and 2, the driving signal, that is, a driving voltage Vd, that is applied to the electrode pairs 114 provides a driving force to locally change the viscosity of the electrorheological fluid 113. The locations and number of the electrode pairs to which the driving voltage is applied, a timing at which the applied driving voltage is released, the locations and number of the electrode pairs from which the driving voltage is released, etc. may be changed or controlled by a controller or a user.

FIG. 3 shows the case where a driving voltage is applied to electrode pairs positioned in an area I and no driving voltage is applied to electrode pairs positioned in areas II. In this case, while a predetermined voltage Vd is applied to the upper electrode patterns 114b, lower electrode patterns 114a positioned in the area I go to a ground state, and lower electrode patterns 114a positioned in the areas II go to a floating stage. Conversely, while a predetermined voltage Vd is applied to the lower electrode patterns 114a, the upper electrode patterns 114b may go to the ground state or floating state. In the following description, electrodes to which the predetermined voltage Vd is applied are referred to as "driving electrodes", and electrodes that face the driving electrodes are referred to as "sensing electrodes".

When the driving voltage Vd is applied to the electrode pairs 114 positioned in the area I, an electric field is formed in the gap between the lower substrate 111 and the upper substrate 112 in the area I. The electric field increases the viscosity of electrorheological fluid 113 in the area I. This is because particles 113 having polarizability are aligned in a line in the direction of the electric field, which is illustrated in FIG. 3. Meanwhile, in the areas II where no driving voltage is applied to the electrode pairs 114, no electric field is formed in the gap between the lower substrate 111 and the upper substrate 112, so that the viscosity of electrorheological fluid 113 in the areas II does not change. When the driving voltage Vd applied to the area I is released, the viscosity of the electrorheological fluid 113 in the area I returns to its original state.

An example of such a touch panel using changes in viscosity of electrorheological fluid is disclosed in detail in U.S. patent application Ser. No. 12/780,996, entitled "Touch Panel and Electronic Device Including the Same", filed on May 17, 2010 by the same applicant. The U.S. patent application discloses a touch panel that defines a predetermined input button area on a user contact surface using changes in viscosity of electrorheological fluid, and offers a clicking sensation similar to that experienced when pressing a mechanical keypad. The entire disclosure of U.S. patent application Ser. No. 12/780,996 is incorporated by reference herein for all purposes.

The clicking sensation is a sense of "clicking" which is felt by a finger when pressing a mechanical keypad or a key button or the like which is used in a mobile phone, etc. In a mechanical keypad, a metal thin plate having a dome shape, which is called a metal dome or popple, is installed below a key button. When the metal dome is pressed with a force exceeding a predetermined criteria, there is a buckling point causing sharp deformation of the metal dome. Due to such a buckling point, a sense of "clicking" (that is, a clicking sensation) can be felt upon pressing a mechanical keypad.

Figure 4:
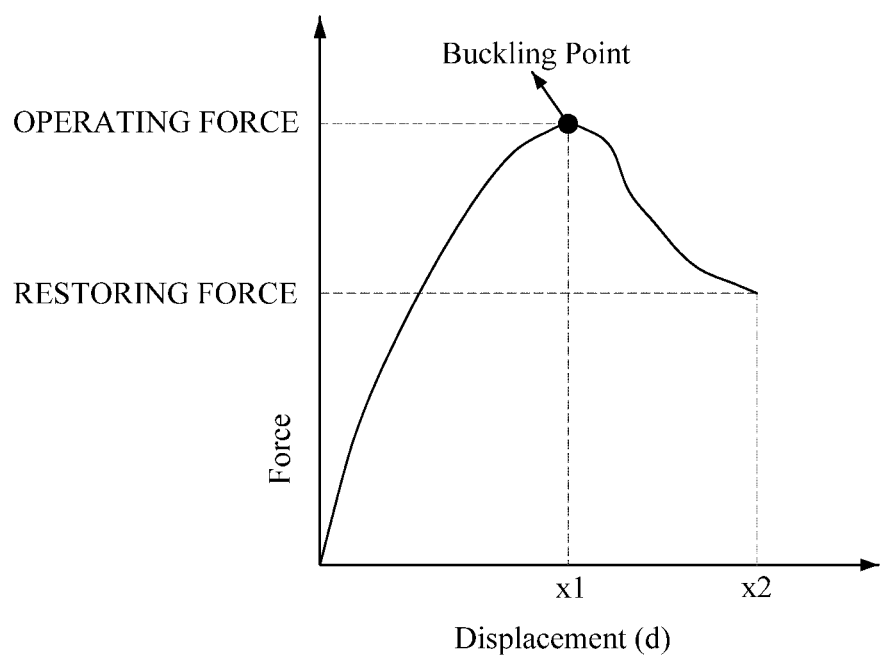
FIG. 4 is a graph showing the relationship between force and displacement in a mechanical key pad having a metal dome.

FIG. 4 is a graph showing the relationship between force and displacement in a mechanical key pad having a metal dome. Referring to FIG. 4, at the initial stage, displacement of the metal dome increases gradually by a pressing force. The increase in displacement of the metal dome increases a supporting force (a force of resistance against the deformation) of the metal dome, and accordingly, a repulsive force also increases. When the displacement of the metal dome reaches ×1, the supporting force of the metal dome becomes a maximum (an operating force) and then sharply decreases. The point where the supporting force of the metal dome becomes a maximum is a buckling point. If the pressing force is maintained even after the buckling point, the displacement of the metal dome continues to increase, and when the displacement of the metal dome reaches ×2, the metal dome reaches the lower electrodes. Thereafter, if the pressing force disappears after the buckling point, the metal dome returns to its original state by a restoring force.

Figure 5:
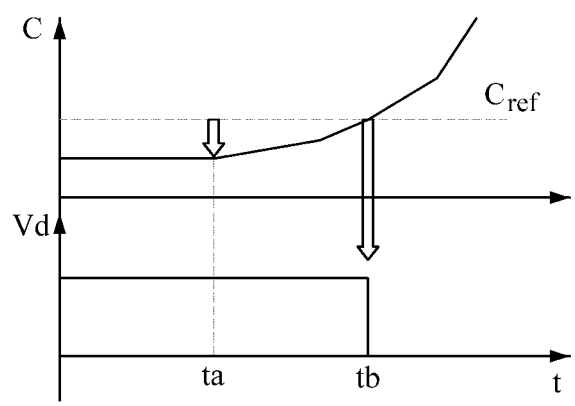
FIG. 5 is a graph for explaining timings at which a driving voltage is applied to and released from electrode pairs of the touch panel body illustrated in FIG. 2.

The touch panel 100 illustrated in FIG. 1 provides an experience of a clicking sensation by imitating a mechanism of a mechanical keypad. FIG. 5 is a graph for explaining timings at which a driving voltage Vd is applied to and released from the electrode pairs of the touch panel 100.

As described above, when the driving voltage Vd is applied to a part of the electrode pairs, the viscosity of electrorheological fluid in the corresponding area increases. The area (hereinafter, referred to as a "driving area") to which the driving voltage Vd is applied and in which the viscosity of electrorheological fluid increases provides a greater repulsive force than the remaining areas (hereinafter, referred to as "non-driven areas"). By appropriately combining driving areas through application of the driving voltage, when pressing the driving area of the touch panel 100, a repulsive force similar to that experienced when pressing a mechanical keypad may be provided.

When the driving area is pressed at a predetermined timing (a timing $t_a$ of FIG. 5), the upper substrate is recessed to decrease the gap between the corresponding electrode pairs, which increases capacitance C at the corresponding node. If the same driving area continues to be pressed, displacement of the upper substrate further increases, which increases the repulsive force of the touch panel 100 and further increases the capacitance C at the node. When the displacement of the upper substrate reaches a predetermined magnitude and accordingly the capacitance C at the corresponding node reaches a predetermined threshold ($C_{ref}$, a method for determining whether the capacitance C reaches the predetermined threshold will be described later), the touch panel determines that an input occurs at the corresponding node at the timing (a timing $t_b$ of FIG. 5). At the same time, the driving voltage Vd applied to the electrode pairs is released. When the driving voltage Vd is released, the viscosity of the electrorheological fluid decreases sharply, and accordingly the repulsive force against the pressing force also decreases rapidly. As such, the touch panel may provide a clicking sensation as in a buckling point at the timing (the timing $t_b$ of FIG. 5) when the driving voltage Vd is released.

Referring again to FIGS. 1 and 3, the driving unit 120 applies the driving voltage Vd to the electrode pairs 114. The driving voltage Vd may be applied to all or a part of the electrode pairs 114. The driving voltage Vd may be applied to the electrode pairs 114 for a predetermined time or for a relatively long time (for a time which the touch panel 100 operates). In both the former and latter cases, the driving voltage Vd may be considered as a driving pulse voltage that is applied to driving electrodes for a predetermined time $t_d$ (see FIG. 8). The time ($t_d$) for which the driving pulse voltage is applied may be fixed, changed or set by a controller or a user.

Applying the driving voltage Vd to an electrode pair or applying the driving voltage Vd to a driving electrode denotes that a predetermined potential difference is formed between a pair of electrodes formed on the lower substrate 111 and the upper substrate 112 such that an electric field is locally formed in the gap between the lower substrate 111 and the upper substrate 112. When an electric field is locally formed, the viscosity of the electrorheological fluid 113 also increases locally. Accordingly, if the driving voltage Vd is applied only to a part of the electrode pairs 114, only an area where the electric field is formed such that the viscosity of the electrorheological fluid 113 increases becomes a driving area, and the viscosity of electrorheological fluid 113 belonging to the remaining areas (non-driven areas) is not changed.

In the case of using line-type electrodes, i.e., an electrode pair 114 having a pair of electrode lines that are orthogonal to each other, which is illustrated in FIG. 2, the driving unit 120 may apply a predetermined magnitude Vd of driving voltage pulse only to upper electrode lines connected to at least one driving cell (a unit area forming a driving area defined by a pair of electrodes), among the upper electrode lines 114b. The driving unit 120 may ground driving electrode lines connected to the corresponding driving cell among the lower electrode lines 114a, and cause the remaining electrode lines to be in a floating state. It will be apparent to one of ordinary skill in the art that voltages applied to the upper and lower electrode lines 114b and 114a by the driving unit 120 can be changed, and the value may be set to a value determined experimentally.

The sensing unit 130 determines whether there is an input on the touch panel body 110, and detects an input location at which the input has occurred. For example, as described above with reference to FIG. 5, the sensing unit 130 may measure a change in capacitance according to a change of the gap thickness between electrode pairs, thereby determining whether there is an input and detecting the location of the input. In this case, if an increase in capacitance at the corresponding location exceeds a predetermined threshold, the sensing unit 130 determines whether there is an input. Then, the sensing unit 130 may detect the input location based on location information of electrode pairs 114 between which capacitance has increased.

For this, the sensing unit 130 may sequentially apply a sensing signal $V_{s,i}$ to the plurality of driving electrodes. Here, applying the sensing signal $V_{s,i}$ to the plurality of driving electrodes may denote that the sensing signal $V_{s,i}$ is applied to the individual driving electrodes, sequentially, or that the sensing signal $V_{s,i}$ is applied to each lower electrode line 114a or to each upper electrode line 114b. By sequentially applying the sensing signal $V_{s,i}$ to the plurality of driving electrodes and sensing a change in capacitance in response to application of the sensing signal $V_{s,i}$, the sensing unit 130 may detect an input location as well as whether there is an input.

The sensing signal $V_{s,i}$ may be a sensing pulse voltage $V_{s,i}$ having a predetermined duration time period (a short duration time period $t_s$ (see FIG. 8) compared to a time period $t_d$ for which the driving voltage Vd is applied, for which one or more sensing operations can be performed while the driving voltage Vd is applied). In this case, the sensing unit 130 may sense the output from sensing electrodes according to the change in capacitance at the corresponding node in response to the sensing signal $V_{s,i}$ applied through the driving electrodes, to determine whether there is an input. A method of determining whether there is an input will be described in more detail later.

The sensing signal $V_{s,i}$ may be applied only to driving electrodes to which the driving voltage pulse Vd has been applied, or sequentially to all driving electrodes. In the latter case, sensing may be performed on driving electrodes to which no driving voltage pulse is applied, as well as on driving electrodes to which the driving voltage pulse is applied. As such, by applying the sensing signal $V_{s,i}$ even to driving electrodes to which no driving voltage pulse is applied, a determination of whether there is an input may be performed on all of driving and non-driven areas of the touch panel.

In this way, the sensing unit 130 scans a sensing voltage pulse sequentially for individual driving electrodes (for example, for row electrode lines or for column electrode lines) in order to determine whether there is an input. Accordingly, the touch panel may sense multiple touches.

Information on whether there is an input and/or information regarding an input location (that is, an input signal), which are sensed by the sensing unit 130, may be transferred to the driving unit 120. When the driving unit 120 receives an input signal, a driving voltage Vd applied to all or a part of driving electrodes in the driving area may be released. As such, when the driving voltage Vd is released in response to the input signal, a clicking sensation from the touch panel 100 may be provided.

The combining unit 140 may combine the driving voltage Vd applied by the driving unit 120 with a sensing signal (for example, the sensing pulse voltage $V_{s,i}$) applied by the sensing unit 130. Generally, the driving voltage Vd for driving the electrorheological fluid 113 may be dozens of volts, for example, about 200V. The magnitude of the driving voltage Vd may depend on the driving properties of the electrorheological fluid 113 or the thickness of the gap between the lower substrate 111 and the upper substrate 112. Meanwhile, the sensing voltage $V_{s,i}$ for sensing a change in capacitance at each node may be several volts (for example, 5V). The magnitude of the sensing voltage $V_{s,i}$ also may depend on the electrical properties of a circuit constructing the sensing unit 130, and the circuit may be constructed such that sensing operations can be performed with a voltage relatively lower than the driving voltage Vd. In this case, the combining unit 140 may subtract the sensing voltage $V_{s,i}$ from the driving voltage Vd, and output the resultant voltage to the driving electrodes. A method for subtracting the sensing voltage $V_{s,i}$ from the driving voltage Vd and outputting the result will be described in more detail, later. The subtracted voltage functions as a sensing signal without influencing driving of the electrorheological fluid 113.

The selecting unit 150 selectively applies a combined voltage Vc output from the combining unit 140 or the sensing voltage $V_{s,i}$ applied by the sensing unit 130, to the driving electrodes. For example, the selecting unit 150 may apply the combined voltage (that is, a voltage pulse Vc functioning as a sensing signal while driving the electrorheological fluid 113) to driving electrodes positioned in a driving area or to electrode lines connected to at least one driving cell. Also, the selecting unit 150 may apply only the sensing voltage $V_{s,i}$ applied by the sensing unit 130 to driving electrodes in the remaining areas except from the driving area where the viscosity of the electrorheological fluid 113 increases, or to electrode lines connected to no driving cell.

Figure 6:
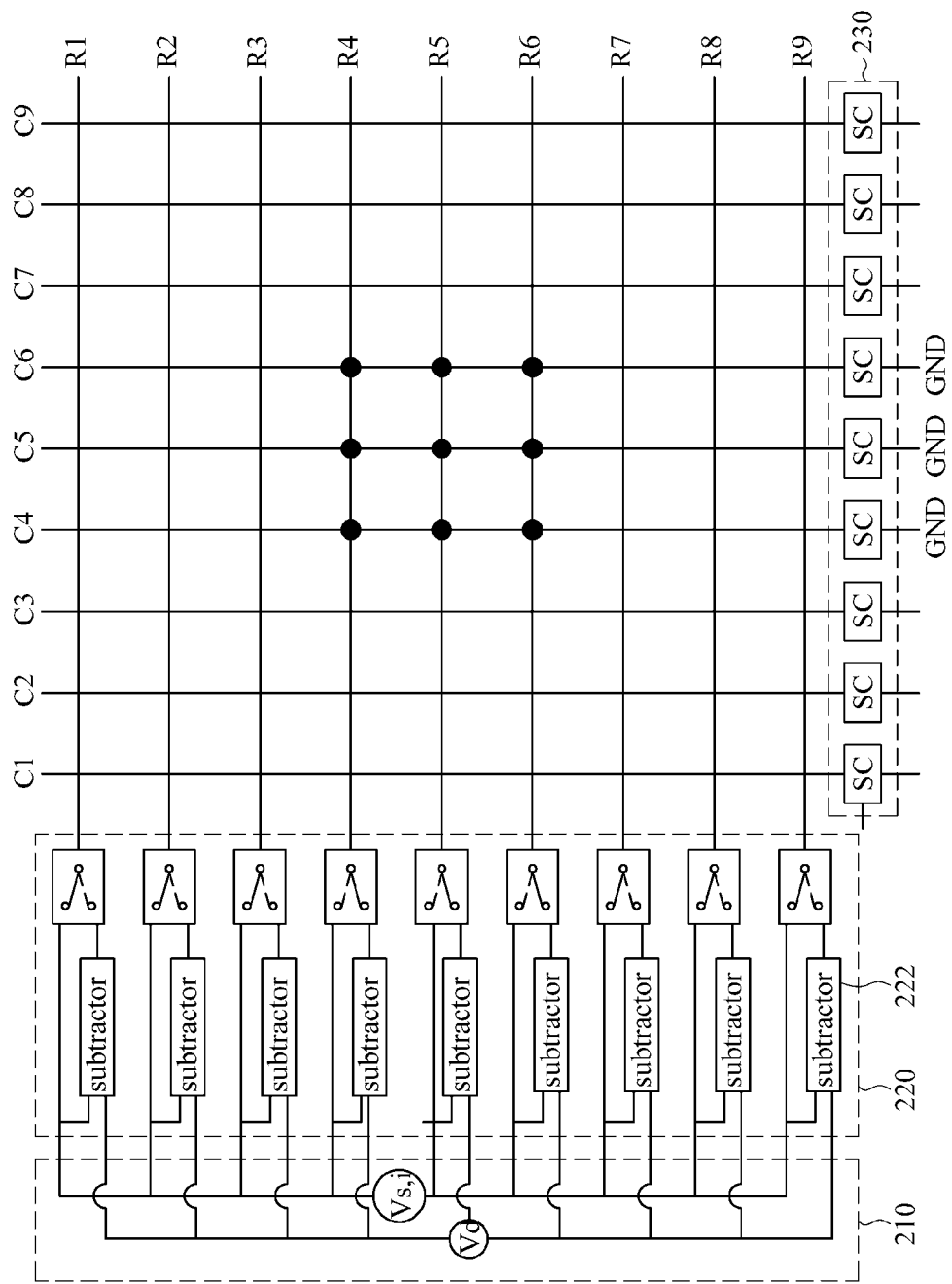
FIG. 6 is a view for explaining an example of a circuit structure for driving and sensing a touch panel according to an embodiment.

FIG. 6 is a view for explaining an example of a circuit structure for driving and sensing an input on a touch panel according to an embodiment. The circuit structure illustrated in FIG. 6 may be a circuit structure for a part (nine lower electrode lines 114a and nine upper electrode lines 114b) of the electrode pairs 114 of the touch panel body 110 illustrated in FIG. 2. In this case, the lower and upper electrode lines 114a and 114b of the touch panel body 110 illustrated in FIG. 2 may correspond to row electrode lines R1 through R9 and column electrode lines C1 through C9 illustrated in FIG. 6, respectively, or vice versa. In FIG. 6, intersections of the row driving electrodes R4 through R6 and the column driving electrodes C4 through C6, among intersections of the row driving electrodes R1 through R9 and the column driving electrodes C1 through C9, which are represented as dots, are driving cells (accordingly, an area including the nine dots is a driving area). However, this is only exemplary.

Referring to FIG. 6, a driving and sensing circuit of the touch panel includes a pulse generating circuit part 210, a pulse applying circuit part 220, and a sensing circuit unit 230. The touch panel may further include a controller for controlling the operation of the driving and sensing circuit, which is not illustrated in the drawings. The configuration of the driving and sensing circuit illustrated in FIG. 6 may be shown to be more or less different from the configuration of the touch panel 100 illustrated in FIG. 1, but this is only a difference from a point of view and the both configurations may be substantially the same. For example, the pulse generating circuit part 210 illustrated in FIG. 6 may correspond to the driving unit 120 for applying the driving voltage Vd and the sensing unit 130 for applying the sensing voltage $V_{s,i}$, which are illustrated in FIG. 1. Also, the pulse applying circuit part 120 may correspond to the combining unit 140 and the selecting unit 150 illustrated in FIG. 1, and the sensing circuit unit 230 may be a component for performing a function of the sensing unit 130 to sense whether there is an input based on changes in capacitance at each node, that is, a component included in the sensing unit 130. While the pulse generating circuit unit 210 and the pulse applying circuit unit 220 are shown in FIG. 6 as being connected to rows R1 to R9, and the sensing circuit unit 230 is shown as being connected to the columns C1 to C9, this is only an example, and may be reversed such that the sensing circuit unit 230 is provided on the rows and the pulse generating circuit unit 210 and the pulse applying circuit unit 220 are provided on the columns.

The pulse generating circuit part 210 generates the driving voltage pulse Vd and the sensing voltage pulse $V_{s,i}$ and applies the voltage pulse Vd and the sensing voltage pulse $V_{s,i}$ to the pulse applying circuit part 220. The driving voltage pulse Vd is an example of a driving signal for driving electrorheological fluid, and the sensing voltage pulse $V_{s,i}$ is an example of a sensing signal for determining whether there is an input. The driving voltage pulse Vd may have a high voltage of dozens or hundreds of volts (for example, about 200V), whereas the sensing voltage pulse $V_{s,i}$ may have a low voltage of several volts (for example, about 5V). Voltages of the driving voltage pulse Vd and the sensing voltage pulse $V_{s,i}$ may depend on the physical structure (for example, the gap thickness between the upper and lower substrates, the electrical properties of electrorheological fluid, and/or the cross section of the driving electrode pairs, etc.) of the touch panel body 110 (see FIG. 2) or the type or electrical properties of sensing circuits (SCs) installed in the sensing circuit unit 230, which has been described above.

The driving voltage pulse Vd may be maintained for a relatively long time period ($t_d$ of FIG. 8), for example, for about 1 second or more. The maintenance time period $t_d$ of the driving voltage pulse Vd may be a predetermined value or set by a controller or a user. Meanwhile, the sensing voltage pulse $V_{s,i}$ may be maintained for a very short time period ($t_s$ of FIG. 8), for example, in unit of several hundredths or thousandths of a second, or in units of microseconds. The shorter the maintenance time period $t_s$ of the sensing voltage pulse $V_{s,i}$, the shorter a sensing period per which the entire surface of the touch panel is sensed.

The pulse generating circuit part 210 generates the driving voltage pulse Vd only for three row electrode lines R4 through R6, rather than for all the row electrode lines R1 through R9, and applies the driving voltage pulse Vd to the pulse applying circuit part 220. In this case, the driving voltage pulse Vd may be applied to the three row electrode lines R4 through R6, simultaneously. Meanwhile, the pulse generating circuit part 210 generates the sensing voltage pulse $V_{s,i}$ for all or a part of the row electrode lines R1 through R9, and applies the sensing voltage pulse $V_{s,i}$ to the pulse applying circuit part 220. That is, the sensing voltage pulse $V_{s,i}$ may be applied to the row electrode lines R1 through R3 and R7 through R9 connected to no driving cells, as well as to the row electrode lines R4 through R6 connected to driving cells. In this case, the driving voltage pulse Vd may be applied to the three row electrode lines R4 through R6, simultaneously. Meanwhile, the pulse generating circuit part 210 generates the sensing voltage pulse $V_{s,i}$ for all or a part of the row electrode lines R1 through R9, and applies the sensing voltage pulse $V_{s,i}$ to the pulse applying circuit part 220. That is, the sensing voltage pulse $V_{s,i}$ may be applied to the row electrode lines R1 through R3 and R7 through R9 connected to no driving cell, as well as to the row electrode lines R4 through R6 connected to driving cells. In this case, nodes to which no driving voltage pulse Vd has been applied are also sensed. The sensing voltage pulse $V_{s,i}$ may be applied to the row electrode lines R1 through R9, sequentially, not simultaneously. By sequentially applying the sensing voltage pulse $V_{s,i}$ to the row electrode lines R1 through R9, the sensing circuit unit 230 may detect an input location while determining whether there is an input.

The pulse applying circuit part 220 may combine the driving voltage pulse Vd received from the pulse generating circuit part 210 with the sensing voltage pulse $V_{s,i}$, and apply the combined voltage to the row electrode lines R1 through R9. For this, the pulse applying circuit part 220 may include a pulse integration circuit 222 for combining the driving voltage pulse Vd with the sensing voltage pulse $V_{s,i}$ for each of the row electrode line R1 through R9. The pulse integration circuit 222 may one-to-one correspond to each of the row electrode lines R1 through R9. In this case, the pulse applying circuit part 220 may include the same number of pulse integration circuits 222 as the number of the row electrode lines R1 through R9.

Figure 7:
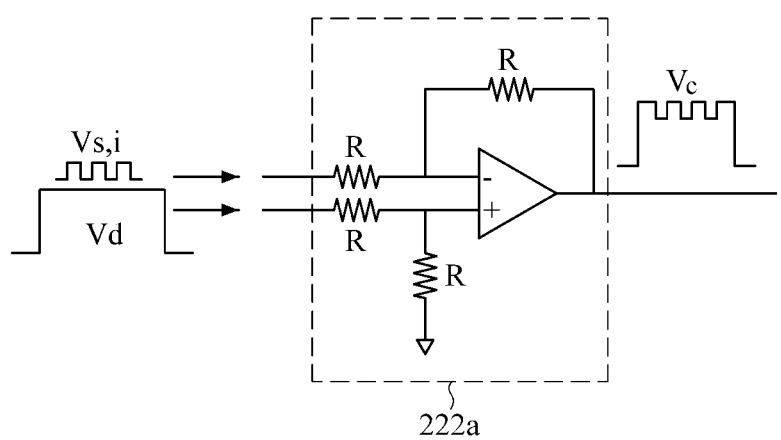
FIG. 7 is a circuit diagram illustrating an example of a subtractor illustrated in FIG. 6.

The pulse integration circuit 222 may be a subtractor. FIG. 7 is a circuit diagram illustrating an operational (OP) amplifier subtractor 222a which is an example of a circuit that can be used as the subtractor. Referring to FIG. 7, when two types of input voltage pulses Vd and $V_{s,i}$ whose magnitudes and maintenance time periods are significantly different from each other are input to the OP amplifier subtractor 222a, the OP amplifier subtractor 222a outputs a combined voltage pulse Vc (in more detail, a subtracted voltage pulse) into which the two types of input voltage pulses Vd and $V_{s,i}$ are combined.

In the touch panel described above, the driving voltage pulse Vd may have a high voltage of dozens or hundreds of volts and the sensing voltage pulse $V_{s,i}$ may have a low voltage equal to or lower than about 5V. The driving voltage pulse Vd and the sensing voltage pulse $V_{s,i}$ are simultaneously applied to the same electrode. For example, the driving voltage pulse Vd and the sensing voltage pulse $V_{s,i}$ are applied through row electrode lines that are driving electrodes. In this case, if a subtractor is used as a circuit for combining pulses, the driving voltage pulse Vd is applied to one input terminal of the subtractor, and the sensing voltage pulse $V_{s,i}$ is applied to the other input terminal of the subtractor, a subtracted voltage pulse Vc output from the output terminal of the subtractor is a high voltage capable of driving electrorheological fluid while also functioning as a sensing signal. This is because the sensing voltage pulse $V_{s,i}$ subtracted from the driving voltage pulse Vd has a relatively low voltage and accordingly functions as a sensing signal for sensing a change in capacitance at each node without influencing driving of electrorheological fluid.

The pulse applying circuit part 220 may select one of the combined voltage pulse Vc received from the pulse combining circuit 222 and the sensing voltage pulse $V_{s,i}$ received from the pulse generating circuit part 210, and apply the selected voltage to the row electrode lines R1 through R9. For this, the pulse applying circuit part 220 may include switching devices 224 for selecting one voltage pulse from among two input voltage pulses. Since the switching devices 224 are also disposed to one-to-one correspond to the row electrode lines R1 through R9, the pulse applying circuit part 220 may include the same number of switching devices 224 as that of the row electrode lines R1 through R9. The switching device 224 may be multiplexer (MUX), and may select one voltage pulse from among the sensing pulse voltage $V_{s,i}$ received from the pulse generating circuit 210 and the combined voltage pulse $Vd-V_{s,i}$ received from the pulse combining circuit 222, and apply the selected voltage pulse to the row electrode lines R1 through R9.

Figure 8:
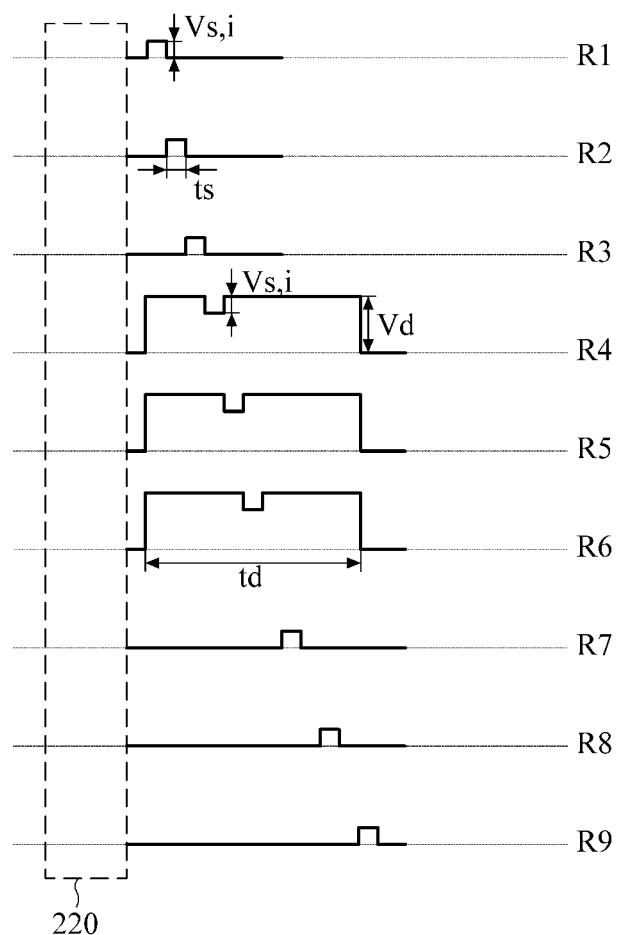
FIG. 8 is a timing chart showing driving voltage pulses and sensing voltage pulses that are applied to the touch panel illustrated in FIG. 6.

FIG. 8 is an example of a timing chart showing the driving voltage pulse Vd and sensing voltage pulse $V_{s,i}$ that are applied to the row electrode lines R1 through R9 of the touch panel illustrated in FIG. 6. FIG. 8 corresponds to the case where three row electrode lines among the row electrode lines R1 through R9 are connected to driving cells. The magnitudes and maintenance time periods of the driving voltage pulses Vd and the sensing voltage $V_{s,i}$ illustrated in FIG. 8 are exemplary, and a ratio of the magnitude of the driving voltage pulses Vd to that of the sensing voltage $V_{s,i}$ or a ratio of the maintenance time period of the driving voltage pulses Vd to that of the sensing voltage $V_{s,i}$ are not limited to this example. Also, FIG. 8 illustrates the case where only one pulse exists for a predetermined maintenance time period $t_s$ of the sensing voltage pulse $V_{s,i}$, but this is only for convenience of drawing. That is, actually, a plurality of pulses (see $V_{s,i}$ of FIG. 7) may exist for the predetermined maintenance time period $t_s$. Referring to FIG. 8, the driving voltage pulse Vd which is a driving signal is applied to the three row electrode lines R4 through R6 connected to driving cells. The sensing voltage pulse $V_{s,i}$ which is a sensing signal is itself sequentially applied to the row electrode lines R1 through R9, or may be combined with the driving voltage pulse Vd and then sequentially applied to the row electrode lines R1 through R9.

Referring again to FIG. 6, the sensing circuit unit 230 senses a change in capacitance at each node in response to a sensing signal (for example, the sensing pulse voltage $V_{s,i}$) sequentially applied to the individual row electrode lines R1 through R9 or column electrode lines C1 through C9. When the sensing signal is sequentially applied to the individual row electrode lines R1 through R9, a change in capacitance at each node may be sensed through an electrical signal that is output from each of the column electrode lines C1 through C9 which are sensing electrodes. On the other hand, when the sensing signal is sequentially applied to the individual column electrode lines C1 through C9, a change in capacitance at each node may be sensed by detecting a change in electrical signal that is output from each of the row electrode lines R1 through R9.

For this, the sensing circuit unit 230 may include at least one sensing circuit (SC) connected to the column electrode lines C1 through C9 to sense a change in capacitance at each node. In more detail, the sensing circuit unit 230 may include a single input sensing circuit that can be connected to all the column electrode lines C1 through C9, or include nine input sensing circuits corresponding to the column electrode lines C1 through C9. As in the former case, if the sensing circuit unit 230 includes the number of input sensing circuits, which is less than the number of the column electrode lines C1 through C9, each input sensing circuit may include a switching device for causing the input sensing circuit to be sequentially connected to a column electrode line. The input sensing circuit will be described in more detail, below.

Figure 9:
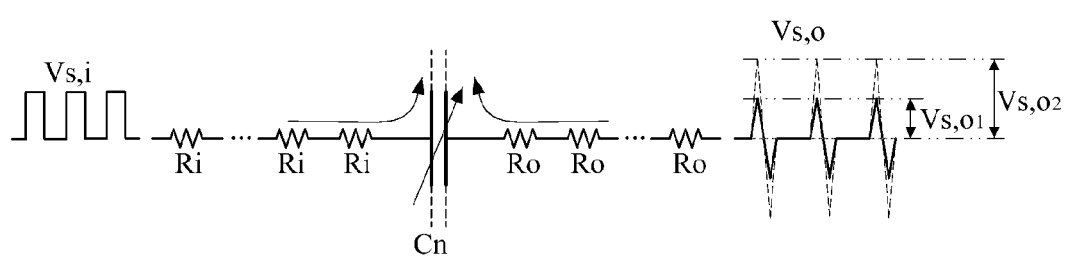
FIG. 9 shows an output voltage $V_{s,o}$ from a sensing electrode when a sensing voltage pulse $V_{s,i}$ is applied to a driving electrode of a capacitance node $C_n$.

Since an input sensing circuit uses the output of the corresponding node, that is, the output from the corresponding column electrode line (a sensing electrode), as an input, the output at the node will be first described below. FIG. 9 shows an output voltage $V_{s,o}$ from a sensing electrode when a sensing voltage pulse $V_{s,i}$ is applied to a driving electrode of a capacitance node C. In FIG. 9, a resistor $R_i$ represents a resistor at the driving electrode, and a resistor $R_O$ represents a resistor at a sensing electrode (for example, a column electrode line). The resistances (in FIG. 9, the numbers of $R_i$ and $R_o$) of $R_i$ and $R_o$ may depend on the locations of nodes. Referring to FIG. 9, when the sensing voltage pulse $V_{s,i}$ is applied to the node $C_n$, the capacitance of which is variable, different output voltages $V_{s,o1}$ and $V_{s,o2}$ appear at the node $C_n$ depending on the capacitance of the node $C_n$. This is because current flowing to the sensing electrode upon charging and discharging depends on capacitance at the corresponding node.

Figure 10:
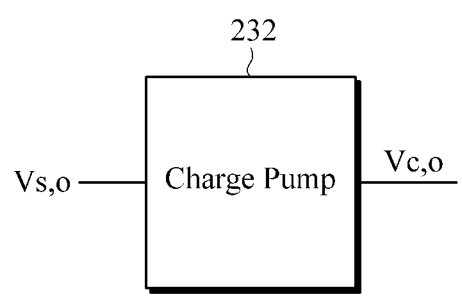
FIG. 10 illustrates an input sensing circuit included in a sensing circuit unit of FIG. 6.

FIG. 10 illustrates an input sensing circuit included in the sensing circuit unit 230 of FIG. 6. Referring to FIG. 10, the input sensing circuit includes a charge pump 232. The output voltage $V_{s,o}$ of a sensing electrode is used as a charge source or source voltage of the charge pump 232. That is, at least one of input terminals of the charge pump 232 is electrically connected to the output terminal of a capacitive node. When the output voltage $V_{s,o}$ of the sensing electrode is used as a charge source of the charge pump 232, the output voltage $V_{c,o}$ of the charge pump 232 is proportional to the magnitude of the output voltage $V_{s,o}$ of the sensing electrode. The proportion relationship between the output voltage $V_{c,o}$ of the charge pump 232 and the output voltage $V_{s,o}$ of the sensing electrode may depend on the configuration of the charge pump 232.

Figure 11A:
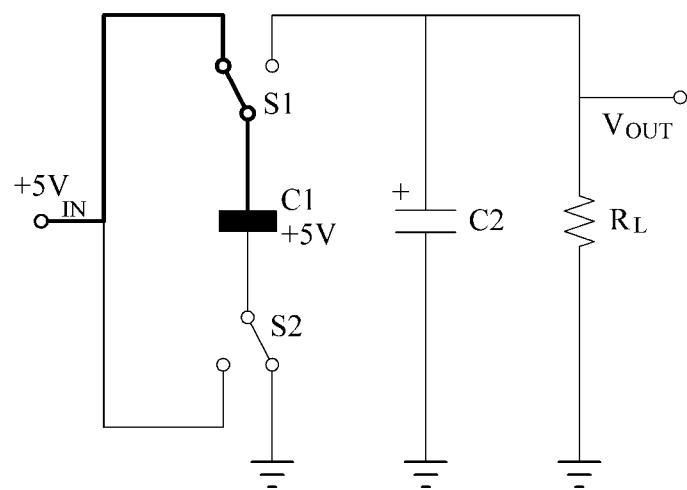
FIGS. 11A and 11B are circuit diagrams for explaining the operation of a charge pump according to an embodiment.
Figure 11B:
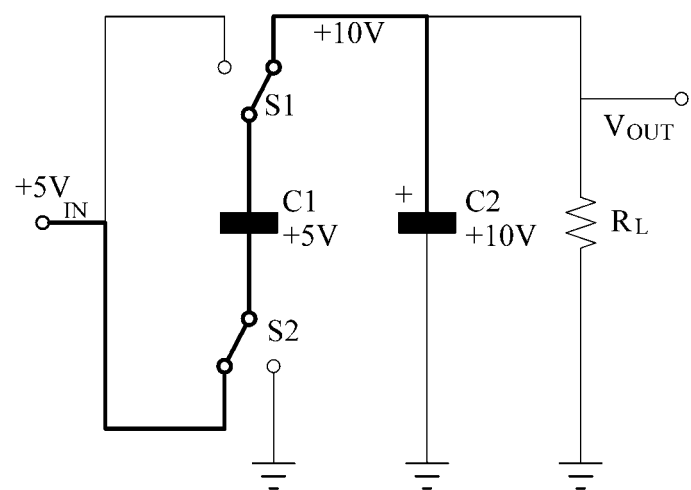

In general, the charge pump 232 is used as a boosting circuit for increasing a DC source voltage using a plurality of capacitors connected in parallel to each other. FIGS. 11A and 11B are circuit diagrams for explaining the operation of the charge pump 232. FIGS. 11A and 11B show exemplary circuit diagrams for explaining the operation of the charge pump 232 functioning only as a boosting circuit, that is, for explaining the relationship between the charge source and output voltage of the charge pump 232. However, the charge pump 232 included in the sensing circuit unit 230 may have various configurations other than the example illustrated in FIGS. 11A and 11B.

Referring to FIGS. 11A and 11B, the charge pump 232 includes two capacitors, that is, a first capacitor C1 and a second capacitor C2 connected in parallel for charging. A single voltage source of about +5 Vin is used as a charge source, and in this case, a source voltage may be sequentially connected to the anode and cathode of the first capacitor C1 and the second capacitor C2 using a first switch S1 and a second switch S2. In FIG. 11A, the first switch S1 couples the anode of the first capacitor C1 to the source voltage of +5 Vin, and the second switch S2 couples the cathode of the first capacitor C1 to ground. In this case, charges from the source voltage +5 Vin are transferred to the first capacitor C1, so that charges of 5V are accumulated in the first capacitor C1, assuming that there are no leaking charges. Meanwhile, in FIG. 11B, the first switch S1 couples the anode of the first capacitor C1 to the second capacitor C2, and the second switch S2 couples the cathode of the first capacitor C1 to the source voltage +5 Vin. As a result, charges from the source voltage +5 Vin are transferred to the second capacitor C2, so that charges of 10V are accumulated in the second capacitor C2. Then, the charges of 10V accumulated in the second capacitor C2 are output and used for another circuit, or used for resistance loads connected to the second capacitor C2.

As such, the charge pump 232 which is a boosting circuit outputs a voltage of 10V that is higher than the source voltage +5 Vin. The output voltage of the charge pump 232 may depend on the magnitude of a source voltage (that is, the capacity of the charge pump 232) and/or the number of capacitors (that is, the number of pumps). In the current example, the sensing circuit unit 230 may determine whether there is an input to each node based on the characteristics of the output voltage of the charge pump 232. In more detail, when there is an input to a node, the output voltage of the corresponding sensing electrode becomes higher than when there is no input to the node, since the distance between electrodes at the node decreases. Accordingly, when the output voltage of the sensing electrode is used as a source voltage of the charge pump 232, the output voltage of the charge pump 232 when there is an input to a node becomes higher than when there is no input to the node. Also, by using the charge pump 232, differences in output voltage of a sensing electrode may be accumulated. For example, differences in output voltage of the charge pump 232 may be proportional to the number of capacitors connected in parallel to each other. Accordingly, by using the characteristics of the charge pump 232 whose source voltages are accumulated, stable sensing insensitive to impulse noise is possible.

Figure 12:
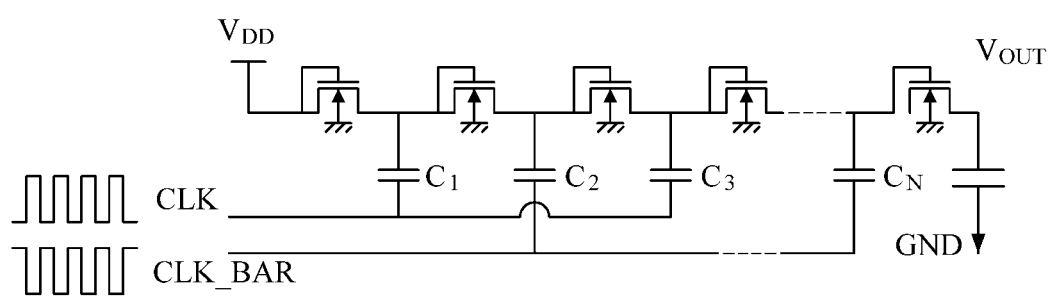
FIG. 12 is a circuit diagram of a Dickson charge pump.
Figure 13:
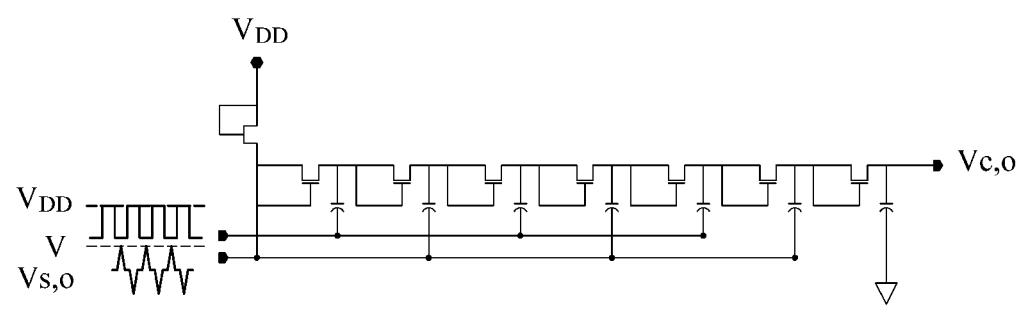
FIG. 13 is a circuit diagram illustrating an example of a charge pump that can be included in the sensing circuit unit of FIG. 6.

FIG. 12 is a circuit diagram of a Dickson charge pump which is another example of a charge pump. Referring to FIG. 12, the Dickson charge pump includes N stages, which denotes that the Dickson charge pump includes N capacitors $C_1, C_2, C_3, \ldots, C_N$ connected in parallel to each other for charging. Non-overlapping clock signals are applied to the capacitors $C_1, C_3, \ldots$ belonging to the odd-numbered stages of the N stages and to the capacitors $C_2, \ldots$ belonging to the even-numbered stages of the N stages, respectively. The non-overlapping clock signals indicate clock signals alternately generating pulses that do not overlap each other, as denoted by CLK and CLK_BAR in FIG. 12. The non-overlapping clock signals CLK and CLK_BAR are respectively input to the clock input terminals of the Dickson charge pump. As a result, the output of the Dickson charge pump, that is, the output $V_{OUT}$ of the capacitor $C_N$ becomes $(V_{DD}-V_t)\times N$. Here, $V_t$ denotes a loss voltage due to resistance of transistors. The charge pump 232 included in the sensing circuit unit 230 may be the Dickson charge pump having the above-described structure. FIG. 13 is a circuit diagram illustrating an example of a charge pump that can be included in the sensing circuit unit 230, and shows a modified circuit of a Dickson charge pump having seven stages. Referring to FIG. 13, the modified circuit of the Dickson charge pump basically has the same structure as the circuit of the Dickson charge pump illustrated in FIG. 12. Also, like the Dickson charge pump of FIG. 12, a square-wave clock signal CLK is applied to a part (in FIG. 13, odd-numbered stages) of the seven stages. Meanwhile, an output voltage $V_{s,o}$ transferred from a sensing electrode of a touch panel, that is, a short pulse that is the output from a node in response to a sensing voltage pulse, instead of the non-overlapping clock signal CLK_BAR (see FIG. 12), is applied to the remaining stages (in FIG. 13, the even-numbered stages) of the 7 stages. One of the clock input terminals of the modified Dickson charge pump is electrically connected to the output terminal of the capacitance nodes. As a result, the output of the modified Dickson charge pump, that is, the output $V_{c,o}$ of the seventh capacitor $C_7$ becomes $(V_{DD}-V_t)\times 3+(V_{s,o}-V_t)\times 4$ or $(V_{DD}-V_t)\times 4+(V_{s,o}-V_t)\times 3$. Here, $V_t$ denotes the voltage of each transistor of the Dickson charge pump.

Figure 14A:
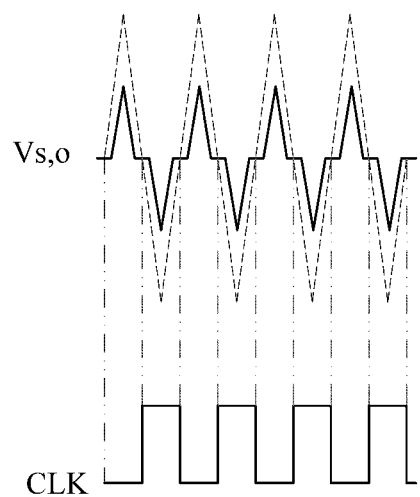
FIG. 14A illustrates a waveform of a source voltage that is applied to the Dickson Charge Pump illustrated in FIG. 13.

FIG. 14A illustrates an example of a waveform of a source voltage $V_{s,o}$ that is applied to the Dickson Charge Pump illustrated in FIG. 13. A source voltage $V_{s,o}$ illustrated in the upper portion of FIG. 14A is an output voltage pulse from a sensing electrode, wherein solid lines represent the waveform of the source voltage $V_{s,o}$ when there is no input to the corresponding node, dotted lines represent the waveform of the source voltage $V_{s,o}$ when the capacitance of the corresponding node increases due to occurrence of an input to the node, and a source voltage CLK illustrated in the lower portion of FIG. 14A is a square-wave clock signal. The source voltage $V_{s,o}$ and the source voltage CLK are non-overlapping clock signals.

Figure 14B:
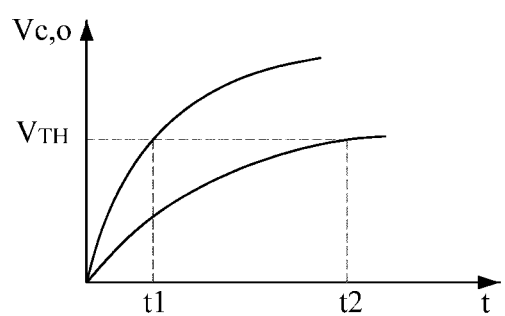
FIG. 14B is a graph showing the output of the Dickson charge pump of FIG. 13 when the source voltage illustrated in FIG. 14A is applied to the Dickson Charge Pump.

FIG. 14B is a graph showing the output $V_{c,o}$ of the Dickson Charge Pump of FIG. 13. In FIG. 14B, like FIG. 14A, a solid line represents the case where there is no pressing input to the corresponding node of a touch panel, and a dotted line represents the case where there is a pressing input to the corresponding node of the touch panel. Referring to FIG. 14B, the output $V_{c,o}$ of the modified Dickson charge pump is proportional to the output voltage $V_{s,o}$ at the node, that is, the output voltage $V_{s,o}$ at the sensing electrode. That is, since a voltage increase speed of the charge pump circuit depends on whether there is a touch onto the touch panel, it may be determined whether there is an input to the touch panel by measuring the output $V_{c,o}$ of the modified Dickson charge pump having different voltage increase speeds. For example, it may be determined that there is an input to the touch panel, when a time t at which the output $V_{c,o}$ of the modified Dickson charge pump reaches a reference voltage $V_{th}$ is earlier than a reference time (for example, $t_2$). Alternatively, according to an example, by determining whether there is an input, after dividing a reference voltage $V_{th}$ into a plurality of voltage levels and classifying time periods in which the output $V_{c,o}$ of the modified Dickson charge pump reaches the individual voltage levels into reference time periods, an input operation may be set to one of multiple stages, and accordingly, it is possible to freely adjust the sensitivity of a touch or to determine the strength of a touch.

The output $V_{c,o}$ of the charge pump uses charges accumulated for a predetermined time period, instead of using a momentary voltage, unlike the related art mutual-capacitive type touch panel (for example, a touch panel disclosed in U.S. Patent Application Publication No. 2006-0097991). Accordingly, since the input sensing circuit using the charge pump is stable against impulse noise, input errors due to such impulse noise may be prevented and also a complicated circuit configuration for preventing input errors is not needed.

Figure 15A:
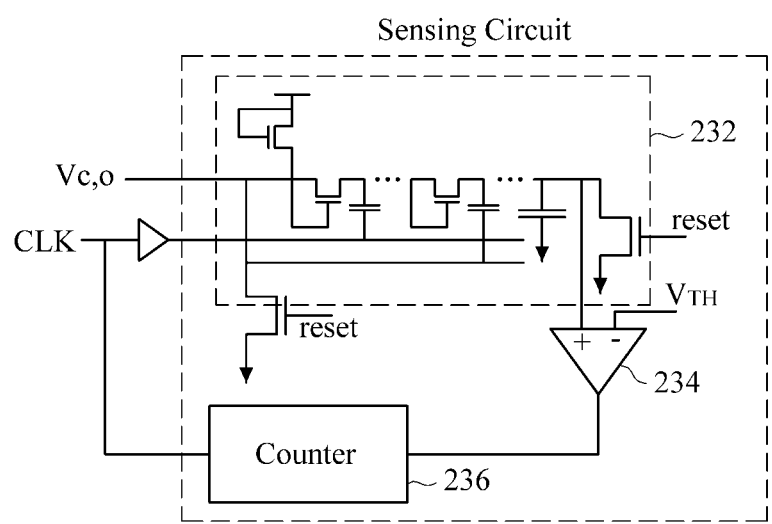
FIG. 15A is a circuit diagram illustrating an example of the sensing circuit unit illustrated in FIG. 6.
Figure 15B:
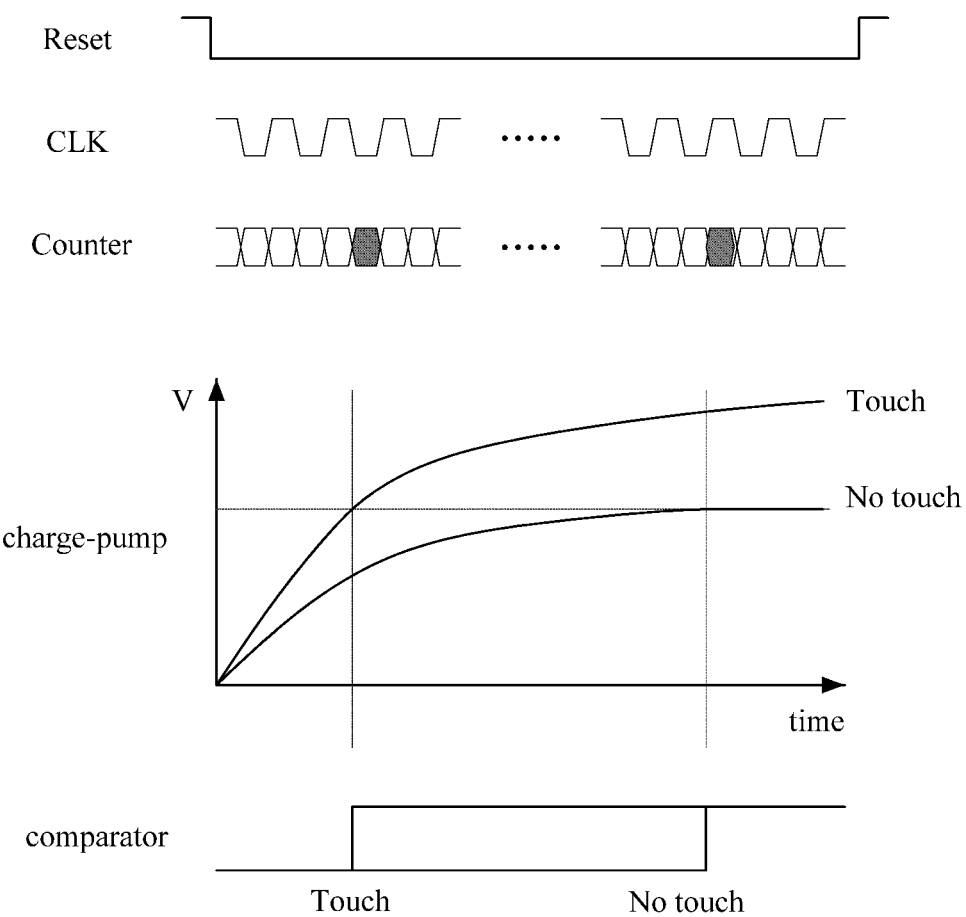
FIG. 15B is a timing chart for explaining the operation of the sensing circuit unit illustrated in FIG. 6.

FIG. 15A is a circuit diagram illustrating an example of the sensing circuit unit 230 illustrated in FIG. 6, and FIG. 15B is a timing chart for explaining the operation of the sensing circuit unit 230. Referring to FIGS. 15A and 15B, the sensing circuit unit 230 includes a modified Dickson charge pump 232, a comparator 234, and a counter 236. As described above, the output voltage $V_{c,o}$ of the modified Dickson charge pump 232 increases at different speeds depending on whether there is an input to a node. The comparator 234 compares the output $V_{c,o}$ of the modified Dickson charge pump with a reference voltage $V_{th}$, and outputs different signals according to the results of the comparison (for example, a signal indicating a time taken to exceed the reference voltage $V_{th}$). The counter 236 may record a time at which the output of the comparator 234 changes, for example, a time at which the output $V_{c,o}$ of the modified Dickson charge pump reaches the reference voltage $V_{th}$. The sensing unit 130 illustrated in FIG. 1 may read a value recorded in the counter 236, and compare the value with a reference value, thereby determining whether there is an input to the touch panel. Also, the sensing unit 130 illustrated in FIG. 1 may determine whether there is a touch (particularly, the sensing unit 130 may detect multiple touches) by reading a value recorded in the counter 236 of the sensing circuit unit 230 connected to each sensing electrode while sequentially applying a sensing signal through driving electrodes. A reset signal illustrated in FIG. 15B is used to reset charges and a voltage accumulated in the modified Dickson charge pump circuit after the capacitance of the touch panel is measured.

Figure 16A:
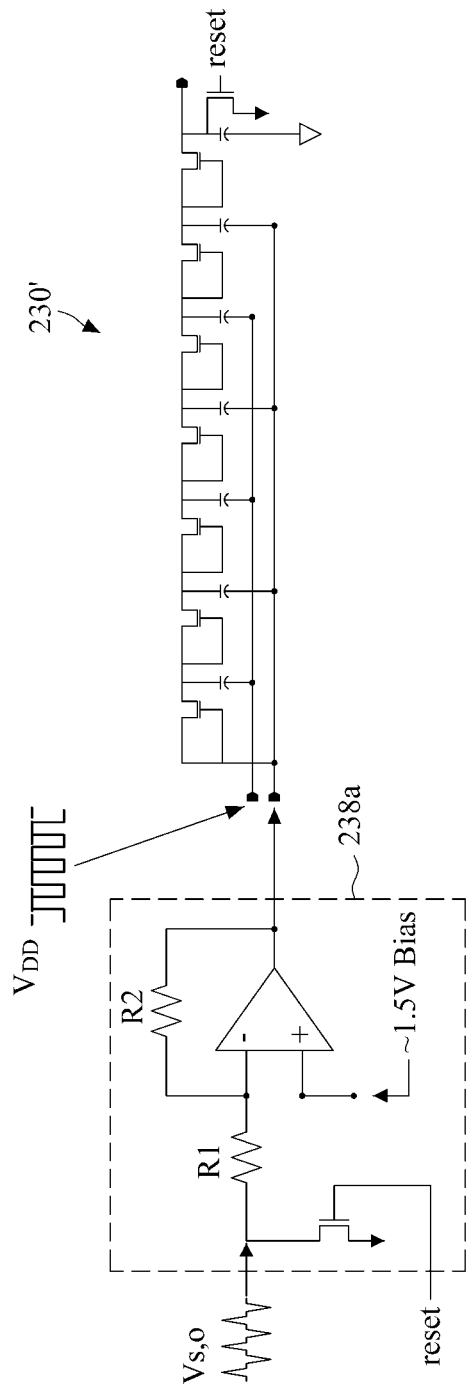
FIG. 16A is a circuit diagram illustrating a modified example of the sensing circuit unit according to an embodiment.
Figure 16B:
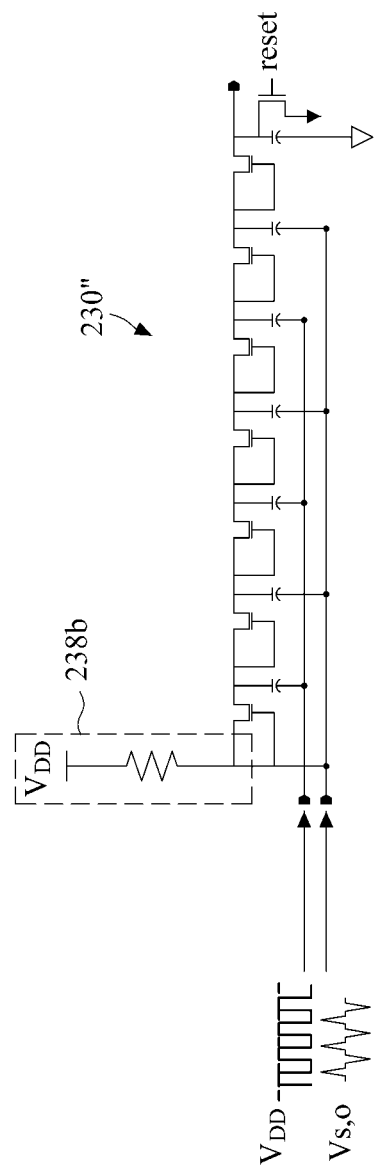
FIG. 16B is a circuit diagram illustrating another modified example of the sensing circuit unit according to an embodiment.

FIGS. 16A and 16B are circuit diagrams illustrating modified examples of the sensing circuit unit. FIGS. 16A and 16B show a sensing circuit unit 230' and a sensing circuit unit 230" respectively of the sensing circuit unit 230. Referring to FIG. 16A, in the sensing circuit unit 230', an OP amplifier 238a is disposed between the output terminal of a sensing electrode and an input terminal of a charge pump. Referring to FIG. 16B, in the sensing circuit unit 230", a pull-up resistor 238b is disposed between the output terminal of a sensing electrode and an input terminal of a charge pump. The OP amplifier 238a and the pull-up resistor 238b are bias stabilizing devices for bias stabilization of the sensing circuit unit 230' and the sensing circuit unit 230" respectively.

Figure 17:
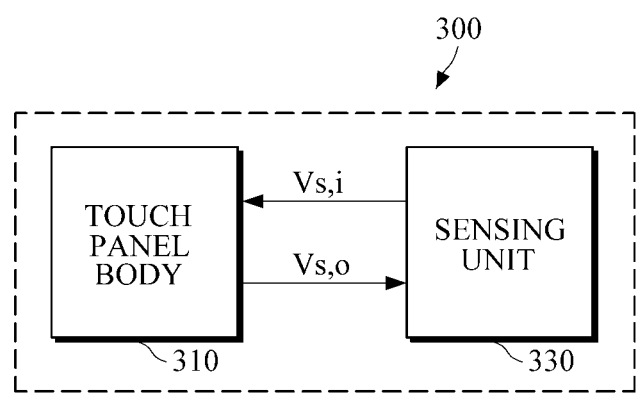
FIG. 17 is a block diagram illustrating another example of a touch panel according to an embodiment.
Figure 18:
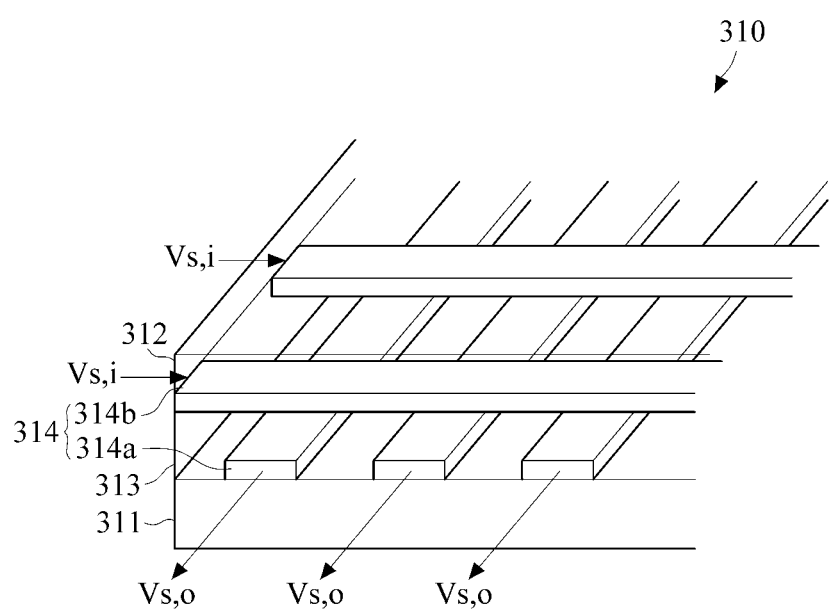
FIG. 18 is a perspective view illustrating a portion of a touch panel body according to an embodiment.

FIG. 17 is a block diagram illustrating another example of a touch panel 300, and FIG. 18 is a perspective view illustrating a portion of a touch panel body 310 illustrated in FIG. 17. FIGS. 17 and 18 show another example of a mutual-capacitive type touch panel, which may have the same configuration as the touch panel disclosed in U.S. Patent Application Publication No. 2006-0097991, the disclosure of which is incorporated by reference herein. Referring to FIGS. 17 and 18, the touch panel 300 includes the touch panel body 310 and a sensing unit 330. The touch panel body 310 includes a pair of substrates, that is, a lower substrate 311 and a upper substrate 312, a dielectric layer 313 inserted into the gap between the lower substrate 311 and the upper substrate 312, and a plurality of electrode pairs 314.

The touch panel 300 is different from the touch panel illustrated in FIGS. 1 and 2 in that a solid, transparent dielectric layer 313 (for example, a dielectric layer 313 formed with polymer such as polyethylene terephthalate (PET) or ceramic dielectric), instead of electrorheological fluid, is inserted between the lower and upper substrates 311 and 312. As a result, since the solid, dielectric layer 313 is inserted between the lower and upper substrates 311 and 312, neither the spacers 115 nor the sealant 116 illustrated in FIG. 2 are used. Also, functionally, since the touch panel 300 determines whether there is an input by detecting a change in capacitance at a node due to charge leakage caused by a touch, no high driving voltage is applied between the lower electrodes 314a and the upper electrodes 314b in order to drive the touch panel 300.

Hereinafter, the touch panel 300 according to the current example will be described based on differences from the above-described examples.

The touch panel body 310 indicates a physical structure constructing the touch panel 300. Meanwhile, the sensing unit 330 may be implemented as an electrical circuit and/or a combination of hardware and software, or only software to control the operation of the touch panel body 310. The sensing unit 330, which is a logical, functional component, may be implemented to be segmented into two or more functional units, or integrated into the touch panel 300 or into a component of an electrical device including the touch panel 300.

As described above, FIG. 18 is a perspective view illustrating a part of the touch panel body 310 of the touch panel 300 illustrated in FIG. 17. The lower substrate 311 is a base substrate of the touch panel body 310. The lower substrate 311 may be formed with glass, a transparent polymer film, etc. Also, the upper substrate 312 has a contract surface S which is contacted upon performing an input operation, and the upper substrate 312 may be formed with a PET film, glass, etc. A dielectric layer such as a PET film is inserted into the gap between the lower and upper substrates 311 and 312. The plurality of electrode pairs 314 are a group of electrode pairs that are defined at intersections between a plurality of lower electrode lines 314a formed on the lower substrate 311 and a plurality of upper electrode lines 314b formed on the upper substrate 312. In a mutual-capacitive type touch panel, the plurality of electrode pairs 314 may be arranged in a matrix on the entire surface or a part of the touch panel body 310.

The sensing unit 330 determines whether there is an input onto the touch panel body 310, and detects an input location when it is determined that there is an input onto the touch panel body 310. For example, the sensing unit 330 may determine whether there is an input and detect an input location by sensing a change in capacitance between the electrode pairs 314 due to charge leakage caused by a touch. In this case, the sensing unit 330 may determine that there is an input, when capacitance measured at the corresponding location decreases to a threshold value. Then, the sensing unit 330 may detect an input location using location information of electrode pairs at which capacitance decreases.

In more detail, the sensing unit 330 may sequentially apply a sensing signal to a plurality of driving electrodes. The sensing signal may be a sensing voltage pulse $V_{s,i}$ having a predetermined maintenance time period. In this case, the sensing unit 330 may sense the output $V_{s,o}$ from a lower electrode line 314a according to a change of capacitance at a node $C_n$ in response to a sensing signal $V_{s,i}$ applied through a upper electrode line 314b, thereby determining whether there is an input. Also, the sensing unit 330 may scan the sensing voltage pulse $V_{s,i}$ sequentially with respect to driving electrodes (for example, row electrode lines or column electrode lines) in order to sense an input, thereby detecting multiple touches. The configuration and operation of the sensing unit 330 may be the same as those described above in the above-described examples, and accordingly, detailed descriptions thereof will be omitted.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
a first substrate on which a plurality of first electrode lines are arranged in parallel;
a second substrate which is spaced apart from the first substrate and on which a plurality of second electrode lines perpendicular to the first electrode lines are arranged in parallel;
a dielectric layer interposed between the first substrate and the second substrate;
a driving unit which applies a driving voltage for driving the dielectric layer to all or a portion of capacitance nodes formed at intersections between the plurality of first electrode lines and the plurality of second electrode lines; and
a sensing unit which determines whether there is an input on the touch panel, based on a change in capacitance at the capacitance nodes,
wherein the sensing unit comprises a charge pump to which an output signal from the intersections between the first electrode lines and the second electrode lines is input as a charge source according to the change in capacitance at the capacitance nodes in response to a sensing signal that is sequentially applied to the first electrode lines, the sensing signal having a sensing voltage different from a driving voltage, and
the sensing unit determines whether there is the input on the touch panel, based on an output voltage of the charge pump.

2. The touch panel of claim, wherein the sensing unit comprises a plurality of charge pumps that are respectively coupled to the second electrode lines.

3. The touch panel of claim 1, wherein the charge pump comprises a plurality of clock input terminals, and
an output signal from the capacitance nodes between the first electrode lines and the second electrode lines is input to at least one clock input terminal among the plurality of clock input terminals of the charge pump.

4. The touch panel of claim 1, wherein the sensing signal comprises a plurality of input voltage pulses having predetermined time intervals.

5. The touch panel of claim 1, wherein the sensing unit further comprises a comparator which compares the output voltage of the charge pump with a reference voltage, and the sensing unit determines whether there is the input on the touch panel, based on an output signal from the comparator.

6. The touch panel of claim 5, wherein the sensing unit further comprises a counter which measures a time period from a reset of the charge pump to a time at which the output voltage of the charge pump reaches the reference voltage based on the output signal from the comparator, and
the sensing unit determines whether there is the input on the touch panel, based on a value stored in the counter.

7. A touch panel comprising:
a touch panel body comprising a first substrate and a second substrate spaced apart from the first substrate by a gap, a plurality of electrode pairs formed on the first substrate and the second substrate, and electrorheological fluid disposed in the gap between the first substrate and the second substrate;
a driving unit which applies a driving voltage for driving the electrorheological fluid to all or a portion of the plurality of electrode pairs; and
a sensing unit which applies a sensing signal to the plurality of electrode pairs, and determines whether there is an input on the touch panel based on a change in capacitance due to a change in thickness of the gap between the first substrate and the second substrate, in response to the sensing signal, the sensing signal having a sensing voltage different from the driving voltage,
wherein the sensing unit comprises a charge pump to which an output signal from the electrode pairs is input as a charge source, in response to the sensing signal, and the sensing unit determines whether there is the input on the touch panel, based on an output voltage from the charge pump.

8. The touch panel of claim 7, wherein if a change in capacitance sensed by the sensing unit exceeds a threshold value, the driving unit releases the applied driving voltage.

9. The touch panel of claim 7, wherein the plurality of electrode pairs comprises a plurality of first electrode lines extending in a first direction on the first substrate and arranged in parallel, and a plurality of second electrode lines extending in a second direction orthogonal to the first direction on the second substrate and arranged in parallel,
wherein while the driving voltage is applied to all or a part of the plurality of electrode pairs, the sensing signal is sequentially applied to the plurality of first electrode lines.

10. The touch panel of claim 9, wherein the sensing unit comprises a plurality of charge pumps that are respectively coupled to the plurality of second electrode lines.

11. The touch panel of claim 7, wherein the sensing signal is a sensing voltage pulse, and the touch panel further comprises a combining unit which combines the driving voltage with the sensing voltage pulse and applies the combined voltage to the electrode pairs.

12. The touch panel of claim 11, further comprising a selecting unit which selects a voltage from the combined voltage combined by the combining unit and the sensing pulse voltage, and applies the selected voltage to the electrode pairs.

13. A touch panel comprising:
a first substrate on which M first electrode lines extend in a first direction and are arranged in parallel, wherein M is an integer equal to or greater than 2;
a second substrate spaced apart from the first substrate, on which N second electrode lines extend in a second direction orthogonal to the first direction and are arranged in parallel, wherein N is an integer equal to or greater than 2;
electrorheological fluid disposed in a gap between the first substrate and the second substrate;
a pulse generating circuit unit which generates a driving pulse voltage for driving the electrorheological fluid and a sensing pulse voltage for determining whether there is an input on the touch panel;
a pulse applying circuit unit which combines the driving pulse voltage with the sensing pulse voltage and apply the combined voltage to the M first electrode lines; and
a sensing circuit unit which senses a change in capacitance at capacitance nodes at intersections between the M first electrode lines and the N second electrode lines, in response to the sensing pulse voltage,
wherein the sensing circuit unit comprises N charge pumps that are operatively connected to the N electrode lines.

* * * * *